United States Patent
Cressy

(10) Patent No.: US 9,718,388 B1
(45) Date of Patent: Aug. 1, 2017

(54) AUTOMOBILE TRASH CAN

(71) Applicant: Eddie Lawrence Cressy, Pearblossom, CA (US)

(72) Inventor: Eddie Lawrence Cressy, Pearblossom, CA (US)

( * ) Notice: Subject to any disclaimer, the term of this patent is extended or adjusted under 35 U.S.C. 154(b) by 1 day.

(21) Appl. No.: 14/863,434

(22) Filed: Sep. 23, 2015

Related U.S. Application Data

(60) Provisional application No. 62/053,925, filed on Sep. 23, 2014.

(51) Int. Cl.
| | |
|---|---|
| *B60N 3/08* | (2006.01) |
| *B65F 1/06* | (2006.01) |
| *B65F 1/16* | (2006.01) |
| *B63B 29/00* | (2006.01) |

(52) U.S. Cl.
CPC ............ *B60N 3/08* (2013.01); *B63B 29/00* (2013.01); *B65F 1/06* (2013.01); *B65F 1/1623* (2013.01)

(58) Field of Classification Search
CPC ... B60N 3/08; B60R 7/043; B60R 2011/0012; B60R 2011/0029; B60R 7/04; B65F 1/067; B65F 1/04; B65F 1/16; B65F 1/1623; B65F 1/06; Y10S 224/928; B63B 29/00
USPC .................................. 224/275, 928
See application file for complete search history.

(56) References Cited

U.S. PATENT DOCUMENTS

| | | | | |
|---|---|---|---|---|
| D180,199 S | * | 4/1957 | Perreault ..................... | 224/482 |
| 3,497,119 A | * | 2/1970 | Beeck ..................... | B60N 3/08 224/275 |
| 3,504,830 A | * | 4/1970 | Trammell, Jr. .......... | B60N 3/08 224/275 |
| 3,526,314 A | * | 9/1970 | Trammell, Jr. .......... | B60N 3/08 220/481 |
| 3,547,326 A | * | 12/1970 | Trammell, Jr. .......... | B60N 3/08 224/275 |
| D335,559 S |   | 5/1993 | Land et al. | |
| 5,662,253 A | * | 9/1997 | Goings ................... | B60R 5/006 224/311 |
| 5,803,325 A |   | 9/1998 | Wang | |
| 6,074,000 A |   | 6/2000 | Wagner | |
| 6,435,587 B1 |   | 8/2002 | Flowerday et al. | |
| 7,914,074 B2 |   | 3/2011 | Lindsay | |
| 8,132,156 B2 |   | 3/2012 | Malcolm | |
| 8,376,200 B2 |   | 2/2013 | Kim | |
| 2001/0050499 A1 |   | 12/2001 | DeLoach et al. | |
| 2005/0224568 A1 | * | 10/2005 | Waugh ..................... | B60N 3/08 232/43.5 |
| 2008/0128460 A1 | * | 6/2008 | Adler ..................... | B60N 2/4876 224/275 |

(Continued)

*Primary Examiner* — Nathan J Newhouse
*Assistant Examiner* — Scott McNurlen
(74) *Attorney, Agent, or Firm* — Christopher Persaud

(57) ABSTRACT

This invention includes a type of portable trash receptacle that can be used by automobile passengers and drivers to dispose of garbage when in an automobile. The trash receptacle is designed to take up unused space next to the driver's seat or passenger seats. The trash receptacle also contains a removable liner, which makes it easier to empty and clean. Furthermore, the trash receptacle is designed to be opened and closed easily, and includes safety features so that it will not disturb the vehicle occupants. The receptacle's shape and location play a role in its ease of use. The invention also includes a method for vehicle occupants to dispose of trash. A variation of this invention can be used on airplanes.

18 Claims, 14 Drawing Sheets

(56) References Cited

U.S. PATENT DOCUMENTS

| | | |
|---|---|---|
| 2009/0115229 A1 | 5/2009 | Messner et al. |
| 2009/0230131 A1* | 9/2009 | McDuffie .................. B65F 1/06 220/495.06 |
| 2012/0189229 A1 | 7/2012 | Reda et al. |
| 2013/0038080 A1 | 2/2013 | Tate |

* cited by examiner

AUTOMOBILE TRASH CAN

REFERENCES CITED

U.S. PATENTS

| PATENT | INVENTOR | PRIORITY DATE |
|---|---|---|
| 7,914,074 | Lindsay | Mar. 10, 2009 |
| 6,074,000 | Wagner | Oct, 22, 1996 |
| 8,132,856 | Wilson et. al. | Jul. 17, 2009 |
| D335,559 | Land | Jun. 14, 2009 |
| 5,803,325 | Wang | Mar. 23, 1996 |
| 6,435,587 | Flowerday et. al. | Jan. 5, 2001 |
| 8,376,200 | Kim | Dec. 23, 2009 |
| 9,016,749 | Mueller et. at. | Sep. 24, 2009 |

U.S. PATENT APPLICATIONS

| APPLICATION | INVENTOR | PRIORITY DATE |
|---|---|---|
| 2009/0115229 | Messner et. al. | Oct. 31, 2008 |
| 2013/0038080 | Tate | Feb. 14, 2013 |

DESCRIPTION OF THE INVENTION

This invention relates generally to the field of waste disposal for occupants of automobiles. A brief discussion of the field of the invention will follow.

Littering is a serious problem in the United States, as is littering on roadsides. Many states have imposed fines for littering on the side of a road. California, for example, has imposed a $1000 fine for littering by the side of state highway.

Many automobile occupants will find that they need to dispose of an article of trash, such as a used soda can, when inside an automobile. In such cases, the occupant of the automobile has no good method of disposing of the trash while driving, or storing it to dispose of later. The occupant can place the article of trash in some of the compartments within the automobile, but that creates the possibility that these compartments will be soiled, or that the automobile's electronics will be damaged by something spilling out of the trash article. The occupant can also put the trash in an empty seat or the floor. This also creates the possibility of discomfort for the vehicle's occupants, and exposes the vehicle's occupants to odors coming from the trash article. There is a need for a trash container for automobiles that keeps the trash separate from the components of the automobile itself, so that when the driver stops and finally disposes of the trash, the components of the automobile will not be soiled. This trash container should also preferably be capable of being used with existing automobiles, with a minimum of installation effort. The trash container should also be designed so that the trash can be removed from the automobile easily when the automobile stops.

Drivers and occupants of trucks, sports utility vehicles, boats, and other motor vehicles suffer from similar problems, in this regard, to those of automobile occupants.

There is a long-felt need for a portable, lightweight trash can/trash receptacle that can be stored and used within an automobile or other motor vehicle, while driving, and which can be opened easily by drivers and passengers, and which does not take up space in a manner that interferes with the drivers and the passengers.

This trash can should ideally be easy to clean and empty, and should have safety features included to prevent it from accidentally dislodging and injuring a passenger.

In addition, airplane passengers sometimes wind up with large amounts of trash such as wrappers, soda cans, and cups, especially on long flights. An airplane passenger may also be forced to remain in his or her seat because such trash remains on the tray table in front of the passenger, so the passenger cannot stow the tray table and get up. There is also a need for a portable, lightweight, trash receptacle, which can be used by airplane passengers to store trash, and which can be easily emptied and cleaned after a flight. This trash receptacle should also include safety features, and should not take up space in a manner that interferes with the passengers or crew.

Embodiments of the present invention can fulfill all these goals.

Most automobiles and other motor vehicles have various components below the driver's seat and front passenger's seat, and above the floor. These components may include runners or mechanisms for moving the seat backwards or forwards. These components shall collectively be referred to as the "below-seat components" for purposes of this application.

Here, it will be useful to briefly review the prior art. The inventions of the prior art do not address the same needs as this invention.

U.S. Pat. No. 7,914,074 by Lindsay discloses a rear seat assembly area with a storage compartment, which uses two rails as part of its frame. This is very different from the present invention, which includes a separate liner to store the trash, where the liner can be taken out and emptied. The entire assembly of the present invention is also portable, lightweight, and can be taken out of the automobile, and moved within the automobile, much more easily than Lindsay's invention.

U.S. Pat. No. 6,074,000 by Wagner describes a storage compartment that moves on runners and can be slid under a vehicle seat. This is different from the present invention, though, because the present invention involves solid walls on the outer container, to keep trash inside and to reduce odors. The outer container is also closed most of the time. Wagner's invention does not have any closed compartments and does not have solid walls. It also appears that Wagner's invention would function much less well if it had solid walls, because the storage compartment would become much heavier and harder to slide on runners.

U.S. Pat. No. 8,132,856 by Wilson is drawn to a storage area for electronic devices, under seats that are pieces of furniture, that include a charging station. The drawings of Wilson's patent clearly show that the storage area of Wilson's invention is supposed to be built into pieces of furniture, unlike the present invention, which is not built into an automobile but can be attached to the front seats of an automobile with straps. Furthermore, Wilson's invention appears to be designed to work with stationary furniture, unlike the present invention, which is designed to work inside automobiles, and other vehicles.

Pat. No. D335,559 by Land discloses a foldable trash container to use in automobiles. This trash container is shaped very differently from either the outer container or the liner of the present invention, and is not closed, unlike the outer container of the present invention. Therefore, odors are more likely to escape from Land's invention than from the portable trash can of the present invention.

U.S. Pat. No. 5,803,325 by Wang describes a multifunctional article holder that can rest between the seats of an automobile. This has several differences from the present invention. First, Wang's invention does not include a strap to bind it to the below-seat components of an automobile. The present invention includes this. Second, Wang's invention is designed to fit between car seats, while the present invention is designed to fit in front of the lower part of a car seat, under the user's knees. Third, Wang's invention is designed for a different purpose than the present invention. Wang's invention is an article holder, and does not have any compartments that can be closed to keep in odors when needed. The outer container of the present invention can be closed, and will reduce the odors emanating from any trash inside. The preferred embodiment of the present invention also involves a rigid outer container and a rigid liner, unlike Wang's invention, which seems to be a flexible bag, which would be more flexible than, but not as strong as, the present invention.

U.S. Pat. No. 6,435,587 by Flowerday et. al. discloses a console that includes sliding trays. The console also includes storage areas. The present invention is different because it achieves the purpose of storing trash with much less complexity and much more ease of installation, and convenience of location than the invention of U.S. Pat. No. 6,435,587, which means that the present invention is likely cheaper than the invention of U.S. Pat. No. 6,435,587.

U.S. Pat. No. 8,376,200 by Kim discloses a machine that includes automobile trash bags that hang down from a rod which juts out towards the back seats of an automobile, from the back part of one of the front seats. It is different from the present invention, because it is designed to take up space that can be used for other purposes. The present invention fits into a different space, which is not used for any other purpose, near the feet of a driver or a passenger. Furthermore, the method of attachment of the present invention to the seat is different from the method of attachment of the invention of U.S. Pat. No. 8,376,200 to the seat. The present invention also includes a liner, which contains the trash and can be emptied and cleaned without the outer container being removed, unfastened, or cleaned. This is different from the invention of U.S. Pat. No. 8,376,200, which does not have anything analogous to a liner.

U.S. Pat. No. 9,016,749 by Mueller et. al. discusses a portable storage system which includes storage spaces below automobile seats. This system, though, requires that the automobile be specially designed to accommodate it, or alternatively be redesigned to accommodate it, at significant cost. The present invention is portable, and can be used effectively within an automobile without redesigning the automobile.

Patent application no. 2009/0115229 by Messner et. al. describes a storage compartment that can be placed in vehicles. This storage compartment, however, can only be used in an automobile if the structure of the automobile itself is modified. Therefore, this is substantially different from the device of the present invention, which can be placed in an automobile and secured to a seat, without modifying the structure of the automobile.

Patent application no. 2013/0038080 by Tate describes a vehicle equipped with storage compartments below the seats. It is clear that the storage compartments are part of the structure of the vehicle itself, and also that they do not include anything similar to the liner of the present invention.

These are substantial differences between the invention of Tate and the present invention.

The following numbers will be used to refer to different components of the invention, in the specification, claims, and drawings. (1) Outer container. (2) Liner. (3) Strap. (4) Slot (5) Lid. (6) Back panel. (7) Spring. (8) Flexible outer container. (9) Clip. (10) Feet. (11) Buckle. (12) Screws. (14) Light. (15) Lever. (17) Elastic cord.

The inventor has found that a side-release buckle with male and female interlocking features to be the best type of buckle for the preferred embodiment. However, other types of buckles may work as well. Most automobiles and other motor vehicles have various components below the driver's seat and front passenger's seat, and above the floor. These components may include runners or mechanisms for moving the seat backwards or forwards. These components shall collectively be referred to as the "below-seat components" for purposes of this application. The exact components below the driver's seat or passenger's seat of a vehicle may vary, but this variation is of no importance to the invention. The most important point about the below-seat components, for purposes of this application, is that the strap (3) of the invention can be used to attach the outer container (1) to the below-seat components.

Most embodiments of the invention involves an outer container (1), which can be attached to the structures in an automobile or other motor vehicle that are below either the driver's seat, or the front passenger's seat. The outer container (1) has a lid (5), and inside the outer container is a liner (2). The invention also includes a means of attachment, by which the outer container (1) is attached to the below-seat structure. Multiple structures and methods that fulfill the function of the means of attachment are discussed below.

Versions of the invention can be used in boats, motor homes, passenger trucks, big rig trucks, sports utility vehicles, other motor vehicles, airplanes, and buses.

THE PREFERRED EMBODIMENT OF THE INVENTION

The preferred embodiment comprises an outer container (1), which is a hollow container with a top, bottom, back, and front, and left and right sides. Most embodiments of the outer container are oblong in shape. The top of the outer container is smooth, and has a downward angle of between 35 and 40 degrees between its back and its front. The inventor has found, based on his experimentation, that this angle helps users to open the lid of the outer container easily. A downward angle for the slope of the outer container, of between 10 and 20 degrees, particularly about 15 degrees, will also help the user to operate the lid equally easily. This also helps the user by making it not interfere with the user's legs and feet as he sits in the car. The bottom of the outer container angles upwards between the back and the front, with an angle of between 10 and 25 degrees. An angle of about 10-15 degrees would be most useful, based on the experience of the inventor. This angle also helps the user by making it not interfere with the user's legs and feet as he sits in the car. The corners between the back and both the top and the bottom, the front and both the top and the bottom, the bottom and both the left and right sides, and the top and both the left and right sides, are rounded. This is not a necessary feature, but helps the invention to rest more easily on the floor of the automobile, and makes the embodiment more flexible.

The top of the outer container is the side of the outer container with the lid attached to it. In the preferred embodiment, the right side, left side, and back of the outer container all contain slots (4).

The lid (5) is on the top of the outer container. The lid (5) opens so that the user(s) can put trash into the outer container. See FIG. 3. The lid should ideally be smooth and form a continuous or near-continuous gradient with the outer container, as in FIG. 2. The top of the outer container (1) contains a lip which is raised and rounded slightly, or alternatively lowered and rounded slightly. The rounded part has an inflection point. The user can therefore reach to the part of the lid next to the rounded part of the lip, curl his or her finger under the lip, and open the lid more easily with his or her finger. This allows the user to put trash into the liner inside the embodiment more easily. It is advisable to make the lid thin, so that it will open easily. The lid closes the opening through which trash passes, when the lid is closed. This also helps to reduce any odors resulting from the trash, and helps to ensure that the trash does not fall out of the liner.

The lid is weight-balanced so that after the user opens the lid and puts the trash into the liner, the lid will swing back to a closed position automatically.

The liner (2) is below the lid. When the user opens the lid, and puts trash into the embodiment, the trash will fall into the liner. The lid then closes. This prevents trash from spilling out of the liner, which will make the vehicle neater because the trash will not spill out of the embodiment. It also reduces odors that may come from the garbage which is disposed of, because the odors will have to pass through the additional barrier of the outer container (1) before reaching the occupants of the automobile. The back of the outer container (1) has six slots arranged in two vertical rows of three slots each. These rows are in the left and right corners of the back of the outer container. There is also a vertical row of three slots on the left side of the outer container, next to the corner between the outer container's left side and its back, and another vertical row of three slots on the right side of the outer container, next to the corner between the outer container's right side and back.

Corresponding rows of three slots each are on the left and right side of the outer container. The slots are large enough that the strap can pass through one of the slots on the back of the outer container, into the outer container, and then back out through the corresponding slot on either the left or the right side of the outer container, as illustrated in the drawings. A "corresponding pair" of slots, for purposes of this application, is one first slot on either the left side, or the right side, on the outer container, and the closest slot on the back of the outer container, which is at the same height as the first slot.

The straps should be made out of expandable material, for maximum effectiveness.

This method ensures that one continuous strap passes out from the slots on the leftmost part of the back of the outer container, and passes to the slots on the rightmost part of the back of the outer container, where it enters those slots. The strap then passes out of the slots on the right side of the container. The strap makes a loop which is large enough to surround one of the structures below either the driver's seat or front passenger seat of an automobile (the below-seat components). The male-female side-release buckle is used to tighten or loosen the strap as necessary. The strap then re-enters the outer container through the slots on the left side of the outer container. This configuration allows the user to use the strap to secure the outer container to below-seat components of multiple sizes. If the strap is looped around the below-seat components and secured sufficiently tightly, this ensures that the outer container will stay facing generally upwards, towards the person above it. This makes the invention easier to use, and reduces any risk of the invention "coming loose" and causing problems for the driver or passengers.

More than one strap can be used for this purpose, because the preferred embodiment has three slots each on the left side and the right side of the outer container. The embodiment could then have multiple straps, with each strap being threaded through different slots. The embodiment could also function if each strap was threaded through the same slots. Alternatively, the same strap could be looped around the same below-seat components more than once, and fed through multiple corresponding pairs of slots on the outer container. Each strap can be threaded through the slots, and then the male-female side-release buckle can be used to alter the size of the loop that the strap makes around the below-seat components. In this way, the strap can make a loop that fits compactly around the below-seat components.

It is important to note that another method of attaching the strap(s) to the back of the outer container may be effective. Such other methods should also be considered part of the present invention. For example the straps may be attached to the back of the outer container via adhesives. The straps will still perform effectively, and the adjustable male-female side-release buckle associated with each strap allows the size of the loop that the strap makes around the below-seat components to vary depending on size of the under-seat components that the strap is being looped around. However, the method suggested here is simpler and cheaper.

The strap should be placed around some of the structures below the seat, and tightened through the male-female side-release buckle, and looped back to the outer container. This will draw the outer container close to the below: seat components, until the outer container is pressed securely against the below-seat components that are behind it. This configuration means that the outer container will not "come loose" and disturb the users' feet when the vehicle is in motion. The outer container (1) will also be in a position where the lid (5) faces upwards, and can be opened more easily. If multiple straps (3) are used, or one strap (3) is looped multiple times around the below-seat components, this will attach the outer container (1) more securely to the below-seat components.

If the embodiment has multiple straps (3), or one strap (3) with multiple loops, this is also a safety measure. If there are multiple straps (3), there is less of a chance that one of them will break, and, if one does break, the embodiment will be held in place by others. For example, one strap (3) can be threaded through the upper slots, and a second strap (3) threaded through the lower slots.

The complimentary rows of slots on both sides of the outer container (1) allow the user to attach the outer container (1) to the below-seat components in a way that fits the seat configuration of the particular seat that the outer container (1) is being attached to.

The liner (2) is inside the outer container, below the lid. When the user opens the lid and deposits trash inside the outer container (1), this trash falls into the liner (2), which is directly below the lid (5). The liner (2) is a separate container that is roughly the same shape as the interior of the outer container, but slightly smaller than the interior, so that it can be removed from the interior of the outer container (1) when needed. The liner (2) in the preferred embodiment of the invention has a flat back, a flat front, and two sides that curve into the flat front. The liner (2) also has a bottom. Because the trash deposited by users falls into the liner, the user can remove all the trash in the embodiment by taking the liner out of the outer container and carrying it to a regular trash can to empty it. The user can then put the liner back in the outer container, to use again. The user can do this quickly, without having to undo the buckle or remove the whole embodiment from the vehicle.

Furthermore, the embodiment is easier to empty and clean because the garbage will have little or no contact with the outer container (1), and therefore the outer container (1) will not need to be cleaned often. The liner (2) is the main part of the embodiment that will need to be emptied and cleaned. These features and advantages are more convenient and save time for the user.

The liner (2) which is used in the preferred embodiment is made of dishwasher-safe material and so can be cleaned with dishes in a home dishwasher. The only part of the automobile trash can of the present invention that may need to be cleaned often, can be cleaned in a home dishwasher. This is also a huge convenience for the user.

The liner (2) of the preferred embodiment has two grooves in its interior, at the corners where the left and right sides of the liner (2) reach the back of the liner (2). These grooves are near the top of the liner, and are positioned so that the user can place his fingers in these grooves, which will help the user to grip the liner (2) when removing it from the outer container (1). These grooves can be cut grooves or raised surfaces, (indents) and would be on both sides of the liner up towards the top.

The buckle of the preferred embodiment is a side release buckle with male and female components, of the type shown in the drawings. This type of buckle is part of the preferred embodiment because it is easier for the user to fasten the buckle, when securing the strap around the components below a vehicular driver's seat or passenger seat. However, another type of buckle that secures the strap (3) around the components below the seat will also function as part of the present invention. Other devices and methods that fulfill the functions of the buckle in the preferred embodiment are also a part of the present invention. The present invention explicitly includes the possibility of substituting, in the role of the side release buckle of the preferred embodiment, either a belt-type buckle, a clasp, a buckle slide, a buckle trim, a blimp buckle, or any combination of more than one of these.

The strap should be made of a material such as cloth or another material that has some capacity to stretch, and is strong enough that, when tightened, it can secure the outer container (1) to the below-seat components.

The possibility of the user getting his or her finger caught in the lid, while opening it, is considered minute, but the preferred embodiment eliminates this risk.

The preferred embodiment of the invention is preferred because of its relative simplicity, its reliability, and its lower cost to manufacture. However, the other embodiments of the invention can perform effectively as well.

The unique shape of the outer container, the fact that the invention includes a dishwasher-safe, removable liner, where the garbage is kept, and the strap which attaches the embodiment to parts of the vehicle, are elements that make this invention unique, and like nothing else that has been previously made in the invention's field of endeavor. This combination of features makes the preferred embodiment much easier to use, than any similar invention in the field. This embodiment is easy to open, when in use, because of the way that the top and bottom of the outer container are shaped. The means for attachment, which attaches the embodiment to the parts of the vehicle below the driver's seat or passenger's seat, helps the embodiment to stay upright while the vehicle is being driven, so that the users can move the lid to open the embodiment and put trash inside. This makes the embodiment more reliable, because it will not tip over when the vehicle is in use. Putting trash in the embodiment would be harder if it were tipped over. Furthermore, the removable liner makes the embodiment easier to clean, and easier to use, because a user can just take out the removable liner and empty it, and then put it back inside the outer container, when the liner becomes full. The user will therefore not have to detach the whole of the embodiment from the vehicle, when emptying the embodiment. These additional features have not been described in the prior art related to the field of the invention.

In addition, the invention takes up space which the occupants of the vehicle will not be using. The preferred embodiment is designed to attach to the under-seat components of an automobile or small truck, and to take up space next to a user's legs which the user almost certainly would not have been using. The preferred embodiment also does not disturb the user's legs, or "leg room."

A version of the preferred embodiment, made out of fiberglass, weighs about 2.2 pounds and is very durable. The preferred embodiment can also be made out of plastic, and other materials. It can also be made using injection-molding, or possibly be vacuum-molded. A larger version of the preferred embodiment can be used with sports utility vehicles (SUVs) and larger trucks.

Versions of the preferred embodiment can also be used by passengers on airplanes. Most airline passenger seats have two metal runners and a great deal of empty space underneath them. An airline can easily secure a variation of the preferred embodiment to the metal runners. Passengers can then dispose of trash by putting the trash inside the embodiment. The strap-and-buckle combination described herein with reference to the preferred embodiment will be able to attach the outer container (1) to the runners. On buses, bus seats also often have a great deal of empty space underneath them, and also have some components such as runners below them. A version of the preferred embodiment could easily be placed inside this empty space and secured to the runners or other components below the passenger seats of buses. The strap-and-buckle combination described herein with reference to the preferred embodiment will suffice to perform this goal.

Please note that embodiments of the invention could be used to carry other things besides trash.

Other Embodiments

Other embodiments of the invention, employing different means of attachment may be possible. Such other embodiments are also within the scope of the claimed invention. Some of the other embodiments are discussed below.

The basic principles underlying the invention allow variations of the preferred embodiment that are both much larger and much smaller to be constructed. For example, truck-drivers on long trips may find it convenient to use a much larger version of the preferred embodiment. This much larger version will work just as well as the regularly-sized version, and operates on similar principles. The components of the invention will simply have to be "scaled up" in size to utilize the larger components of the truck.

In a second embodiment, the outer container has small, extendable "feet" as can be seen in the figures. These keep the outer container (1) stable while driving, so that the user(s) can put trash into the outer container (1) easily.

Alternatively, the feet may not be extendable.

In a third embodiment, the outer container is opened by a spring. The lid in this embodiment would interact with a spring, so that if the user pressed down on the lid, this would compress a spring, which would then spring upward and cause part of the lid to go upwards, therefore opening the lid. The lid would open and close by swiveling on a pivot point. The lid would swing past a pivot point, so that the part of the lid which was going down would have to continue going down, thus causing the opening part of the lid to swing up. The spring would be placed below the lid, preferably in a location where it would not obstruct the flow of trash into the liner.

In a fourth embodiment, the user would press down on the lid, which, if pressed hard enough, would swivel pass a pivot point, and then a spring would push the lid down further, causing the lid to open more. The user could then put trash into the liner.

In a fifth embodiment, the outer container would be composed of a flexible material, with a bend in the material of the top of the outer container, next to the lid, and similar to the lip of the solid container in concept. This would allow the user to insert his or her fingers into the area just in front of the lid to open the lid. The flexible material could be canvas of the type that a tent is made out of, or another material.

In a sixth embodiment, the outer container would be solid, but the liner (2) would be composed of a flexible material, such as a bag, that could be lifted out of the outer container and emptied, or alternatively lifted out of the outer container and thrown away. Alternatively, the liner (2) could be composed of a solid material, but with a flexible inner inlay, such as a bag, that would fit inside the liner and could be lifted out of the liner and emptied, or alternatively lifted out of the liner and thrown away.

In a seventh embodiment, the means of attachment between the outer container and the below-seat components is a "clip" which juts upwards and prevents the outer container from coming loose, once the clip is moved into the appropriate position. An illustration of this is in the drawings.

In an eighth embodiment, the outer container (1) is equipped with a flexible back panel (6) which contains flexible, rubber-like substance, so that the flexible back panel can be pressed against the below-seat components and the rubber-like substance will mold itself to them, so that the outer container (1) will rest compactly against the below-seat components, so that the embodiment will be in a position to receive trash and store it, without the need for the strap.

In a ninth embodiment, the outer container would contain a sensor and a small motor, which would cause the lid to open whenever a person's hand was near. Such sensors and motors are known in the prior art.

In a tenth embodiment, the outer container would contain a small light, located on its top, which would illuminate the lid, and make it easier for users to see as they used the embodiment.

In an eleventh embodiment, the lid would be "retractable", in that a user could, by pressing on the lid, push it upwards and towards the back of the outer container. The lid could be designed to move either above or below the top of the outer container as it moves backwards.

In a twelfth embodiment, the means of attachment of the outer container to the below-seat components is a stretchable rope similar in characteristics to the ropes used to make "bungee cords". This would eliminate the need for the rope to be tightened through the slots, and also eliminate the need for a buckle.

It is worth noting, though, that the embodiment with the slots in the outer container and a buckle associated with the strap may function better at securing the outer container to the below-seat components.

In a thirteenth embodiment, the lid (5) is set to be on top of the top of outer container, so that there is room for a larger liner (2). In essence, the lid would not form a continuous gradient with the top of the outer container (1). An example of this is in FIG. 12. The lid (5) will still be able to open and close.

In a fourteenth embodiment, at least two slots (4) can be in the center of the back of the outer container. The strap (3) can pass into and out of the outer container (1) through these, and also be threaded along part of the back of the outer container (1). It is also important to note that it is possible to have two or more slots in the center of the back of the outer container. If there are multiple straps, or one strap that is looped multiple times, these can be threaded through the additional slots. If there are only two slots in the center of the back of the outer container, the straps can be threaded through those two slots.

A fifteenth embodiment of the invention involves a locking mechanism which can be placed on the lid (5) to lock the lid (5) when desired by the user, and to ensure that trash will not fall out of the automobile trash can. Lindsay's invention involved a locking mechanism which was added to the storage container, which shows that a locking mechanism can be added to the lid (5) of the outer container (1) which is part of the instant invention.

A sixteenth embodiment of the invention involves a latch in place of the locking mechanism. The latch will keep the lid (5) closed when desired by the user, and ensure that trash will not fall out of the automobile trash can.

It is worth noting that a clean version of the preferred embodiment can also be used to carry other things besides garbage.

DETAILED DESCRIPTION OF THE DRAWINGS

Figure 1:
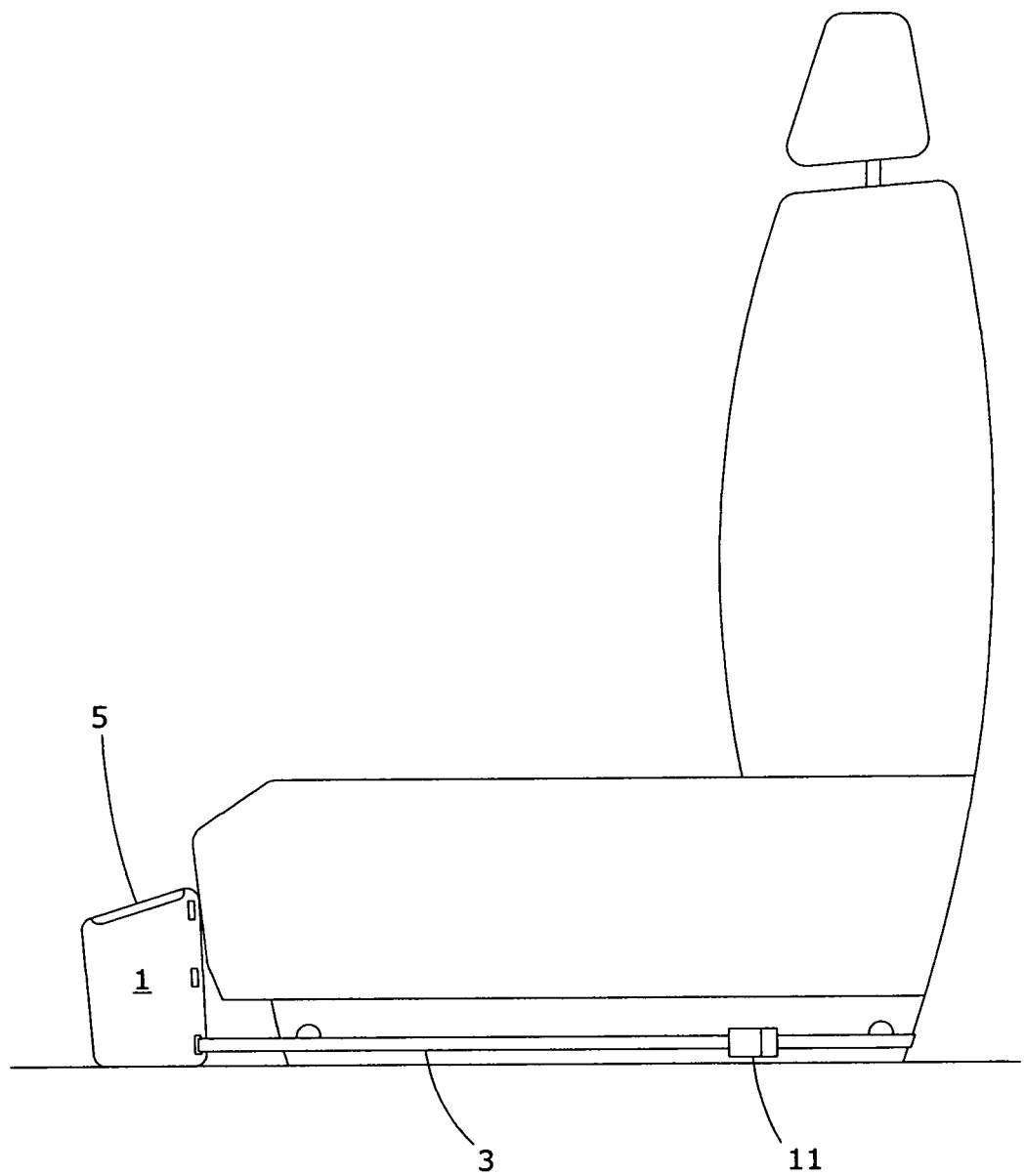
FIG. 1 shows the preferred embodiment of the automobile garbage can, in use next to the driver's side of an automobile.

FIG. 1 shows the preferred embodiment of the automobile garbage can, in use next to the driver's side of an automobile. The means for attachment is a strap with a side-release male-female buckle (3), and that strap is wrapped securely around the lower part of the seat. Therefore, the top opening of the outer container (1) and the lid (5) will remain facing upward, in a position where the driver can easily reach down, open the lid, and drop a piece of trash into the liner. The 35-40 degree downward angle of the lid and the top of the outer container can be discerned. The lid has this angle so that the driver can comfortably open it. The rounded concave shape of the lip can also be seen. This allows the user to open the lid more easily.

Figure 2:
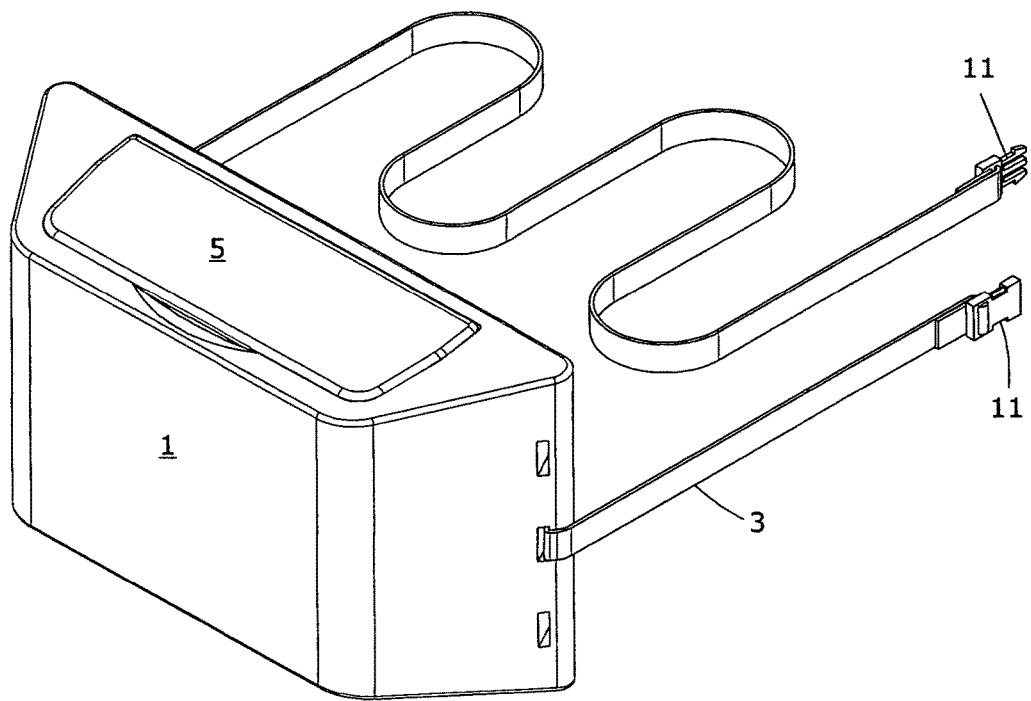
FIG. 2 shows a bird's eye view of the preferred embodiment of the invention.

FIG. 2 shows a bird's eye view of the preferred embodiment of the invention. The outer container can be seen, along with the lid. The downward angle of the lid and the outer container is also visible. The means for attachment, which here is a strap with a buckle, is shown with the strap threaded through the three slots in the outer container.

Figure 3:
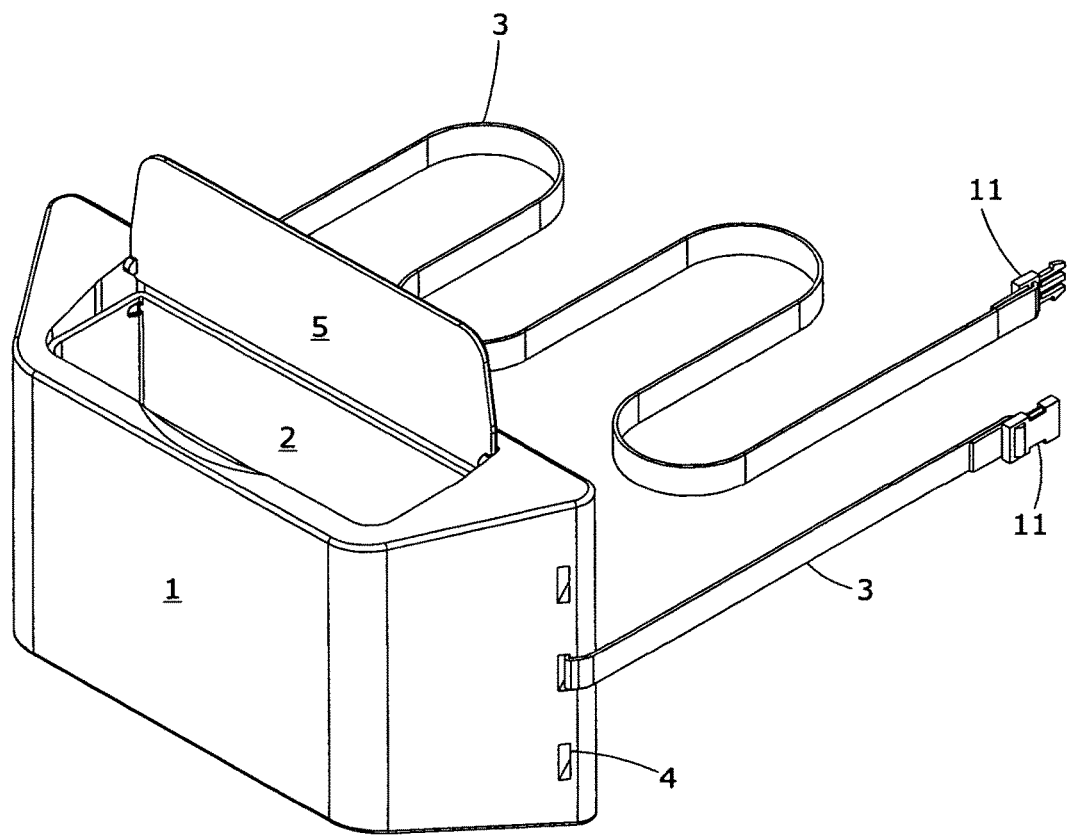
FIG. 3 shows a bird's eye view of the preferred embodiment of the invention with the lid open.

FIG. 3 shows a bird's eye view of the preferred embodiment of the invention with the lid open. Screws (12) can be seen inside the embodiment. They help to keep the embodiment together. The liner (2) can also be seen inside the outer container (1). A groove of the liner is visible.

Figure 4:
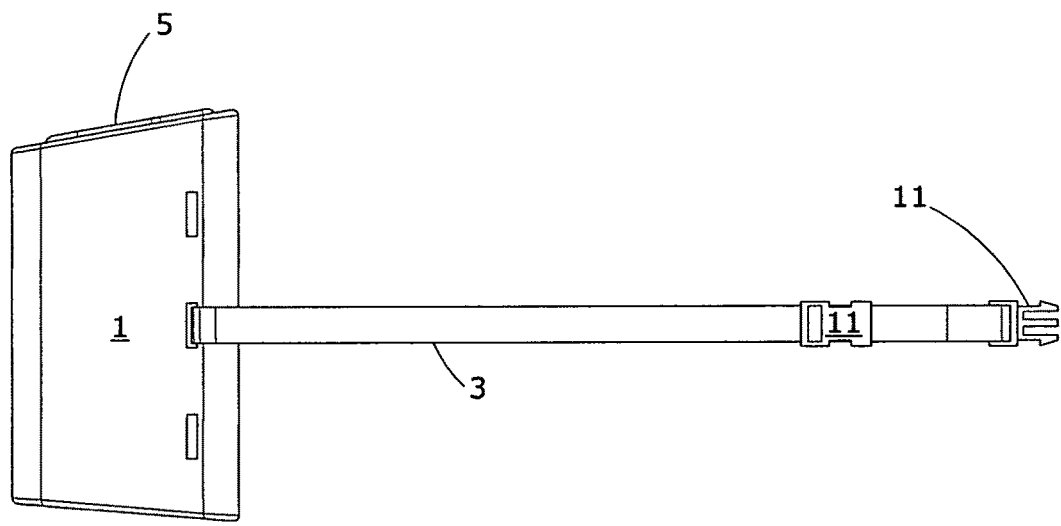
FIG. 4 shows a view of the preferred embodiment of the invention from the left.

FIG. 4 shows a view of the preferred embodiment of the invention from the left. The 35-40 degree angle of the top of the outer container and the 10-15 degree angle of the bottom of the outer container can both be clearly seen. Three of the slots on the left side of the outer container (1) are visible. The strap (3) and buckle can also be seen.

Figure 5:
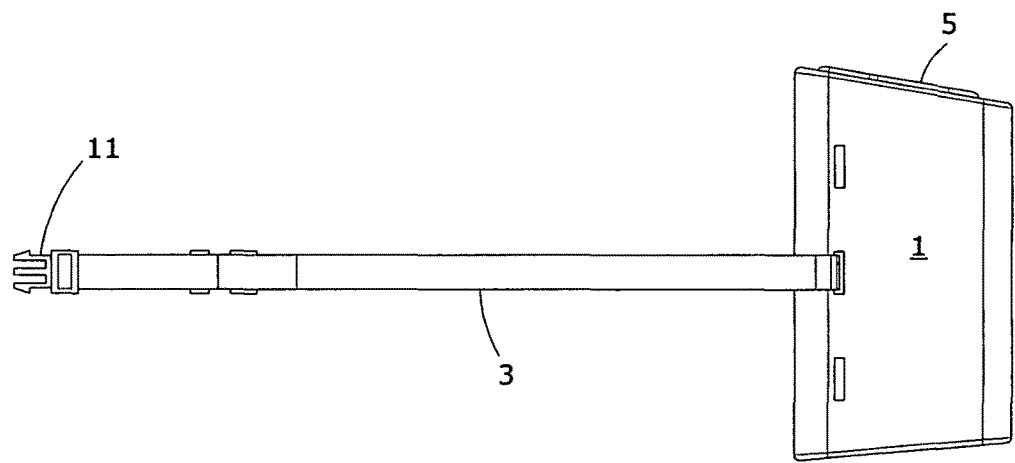
FIG. 5 shows a view of the preferred embodiment of the invention from the right.

FIG. 5 shows a view of the preferred embodiment of the invention from the right. The 35-40 degree angle of the top of the outer container and the 10-15 degree angle of the bottom of the outer container can both be clearly seen. Three of the slots on the right side of the outer container (1) are visible. The strap (3) and buckle can also be seen.

Figure 6:
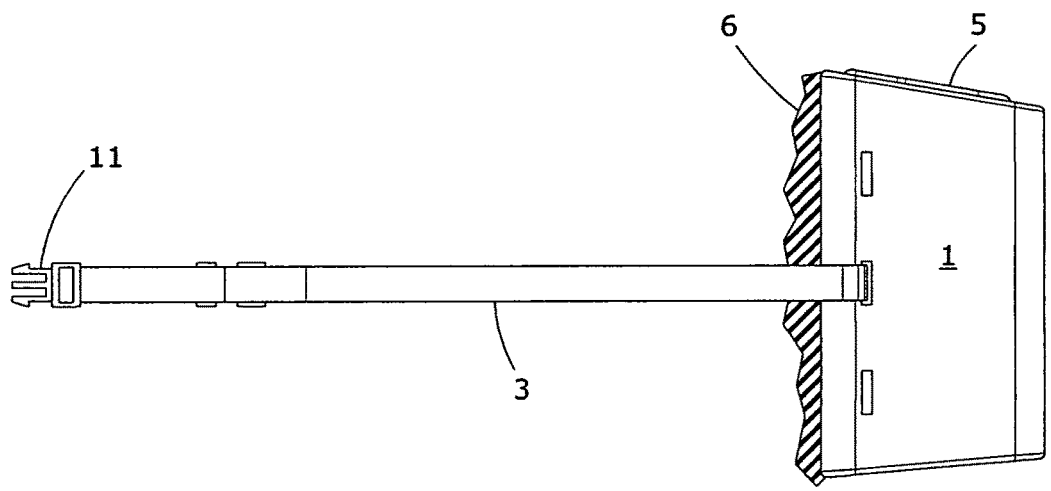
FIG. 6 shows a view from the side of an embodiment of the invention with a back panel (6) composed of rubber.

FIG. 6 shows a view from the side of an embodiment of the invention with a back panel (6) composed of rubber. Here, the three slots on the side of the embodiment are visible. The back panel (6) is also visible, and a user can use the back panel to attach the invention to the under-seat components of an automobile.

Figure 7:
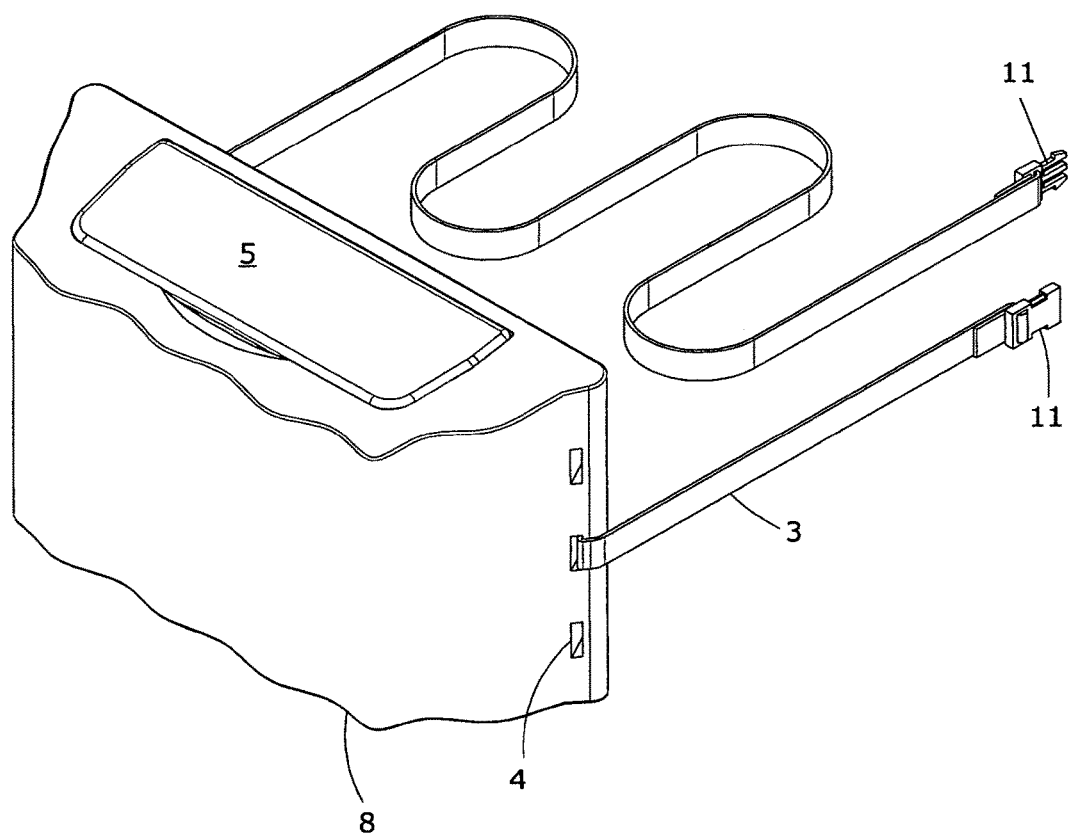
FIG. 7 shows a bird's-eye view of an embodiment of the invention which has a flexible outer container (8).

FIG. 7 shows a bird's-eye view of an embodiment of the invention which has a flexible outer container (8). The ability of the outer container to change shape can be discerned from this drawing. The liner is solid in this embodiment, and does not change shape.

Figure 8:
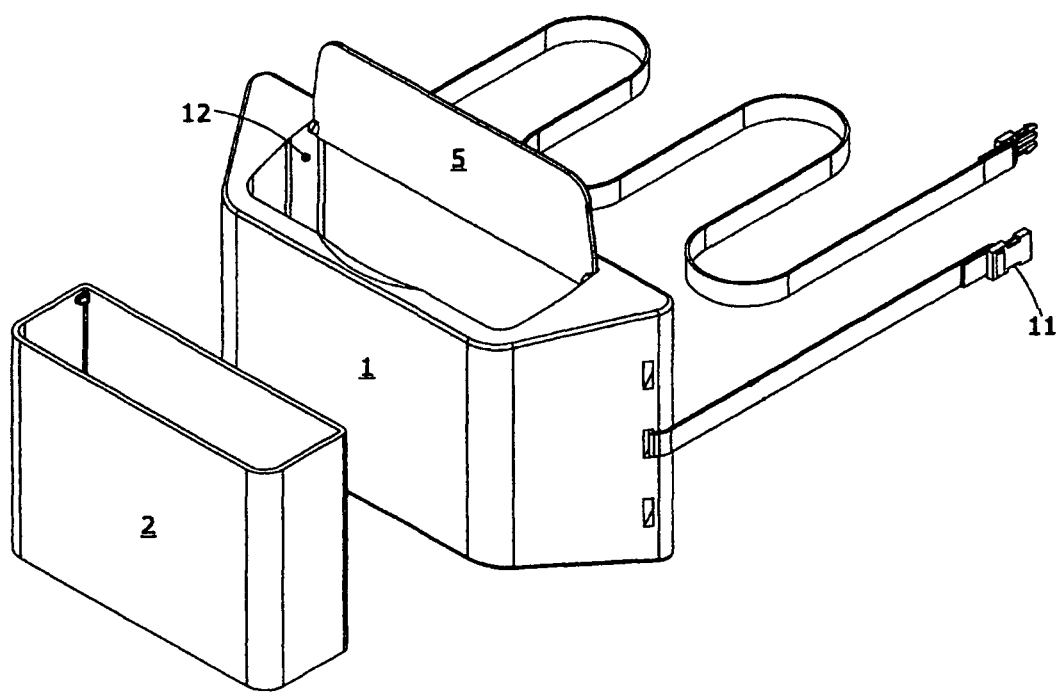
FIG. 8 shows an "exploded" view of the preferred embodiment of the invention. The lid is open and the liner is shown.

FIG. 8 shows an "exploded" view of the preferred embodiment of the invention. The lid is open and the liner is shown. The fact that trash placed into the invention will fall into the liner is discernible.

Figure 9:
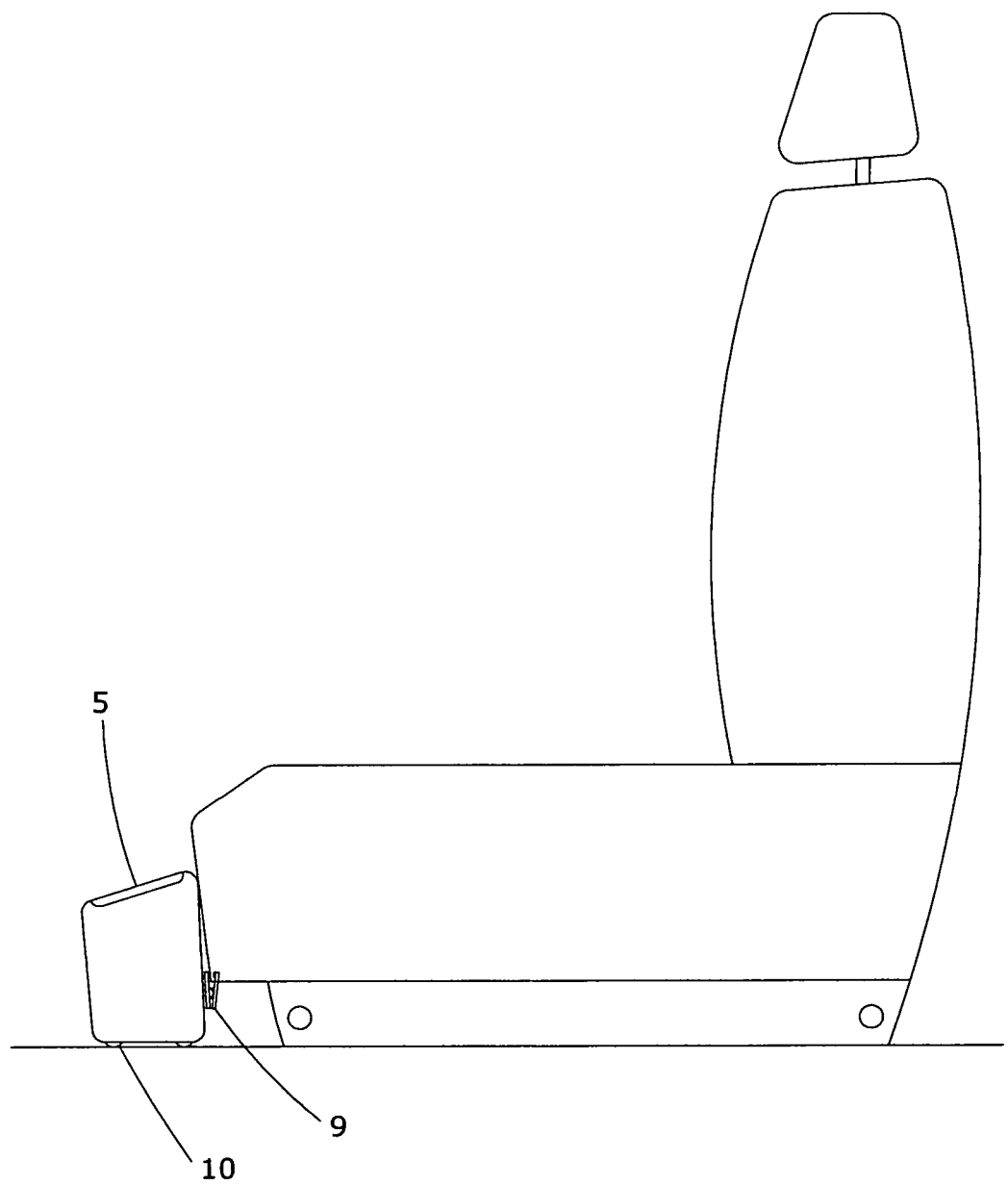
FIG. 9 shows an embodiment of the invention in use next to the driver's side of an automobile, with "feet."

FIG. 9 shows an embodiment of the invention in use next to the driver's side of an automobile, with "feet" (10). The embodiment can be seen near the driver's seat of the automobile. The driver will not be disturbed, and his leg room will not be impeded. The device is attached to the below-seat components with a strap and buckle. The feet help to keep the embodiment upright, which helps its ease of use and is an additional safety feature.

Figure 10:
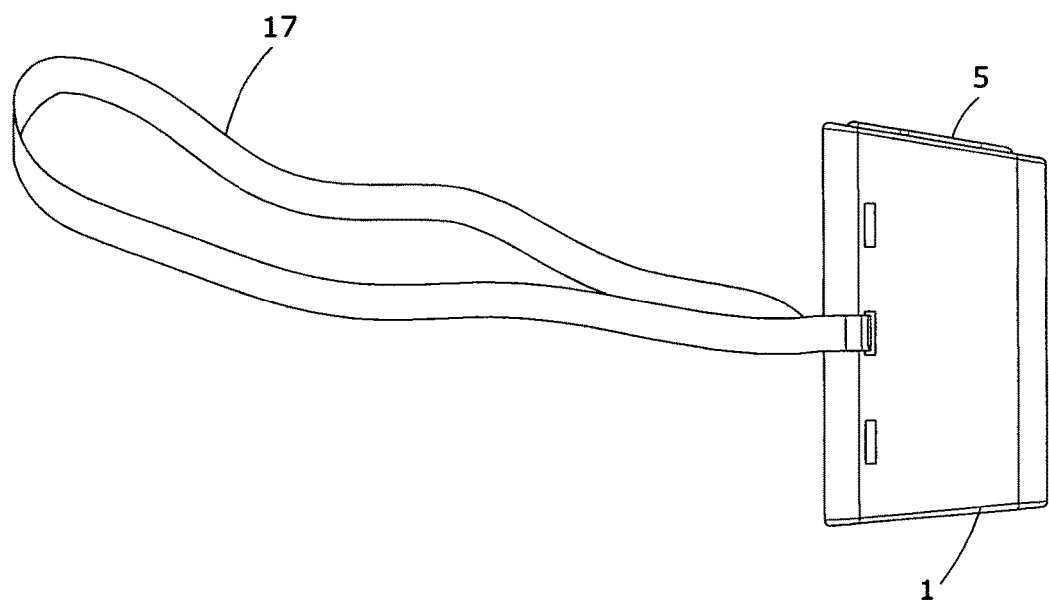
FIG. 10 shows an embodiment of the invention with a "bungee-type" method of attachment.

FIG. 10 shows an embodiment of the invention with a "bungee-type" elastic cord method of attachment. This embodiment does not rely on any kind of buckle, but instead relies of the elasticity of the elastic cord (17). The elastic cord (17) wraps around the below-seat components and ensures that the outer container (1) stays attached to them.

Figure 11:
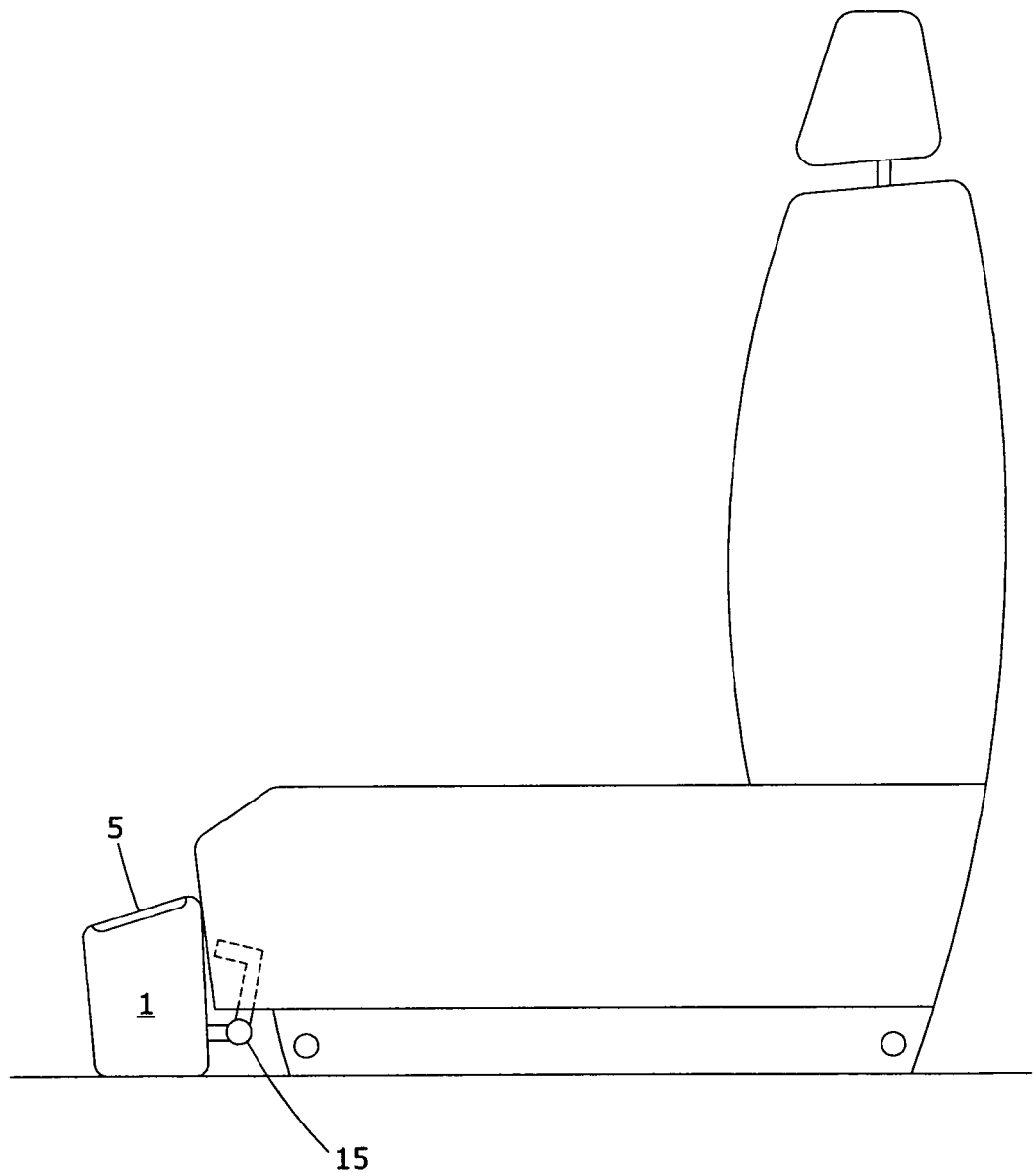
FIG. 11 shows an embodiment of the invention with a lever-type method of attachment.

FIG. 11 shows an embodiment of the invention with a lever-type means of attachment. Here, the lever (15) sticks into the below-seat components and provides a physical barrier against the outer container (1) being moved or changing position. If the outer container does not move or change position, this makes it more likely that vehicle occupants will be able to reach down and deposit trash in the embodiment when desired.

Figure 12:
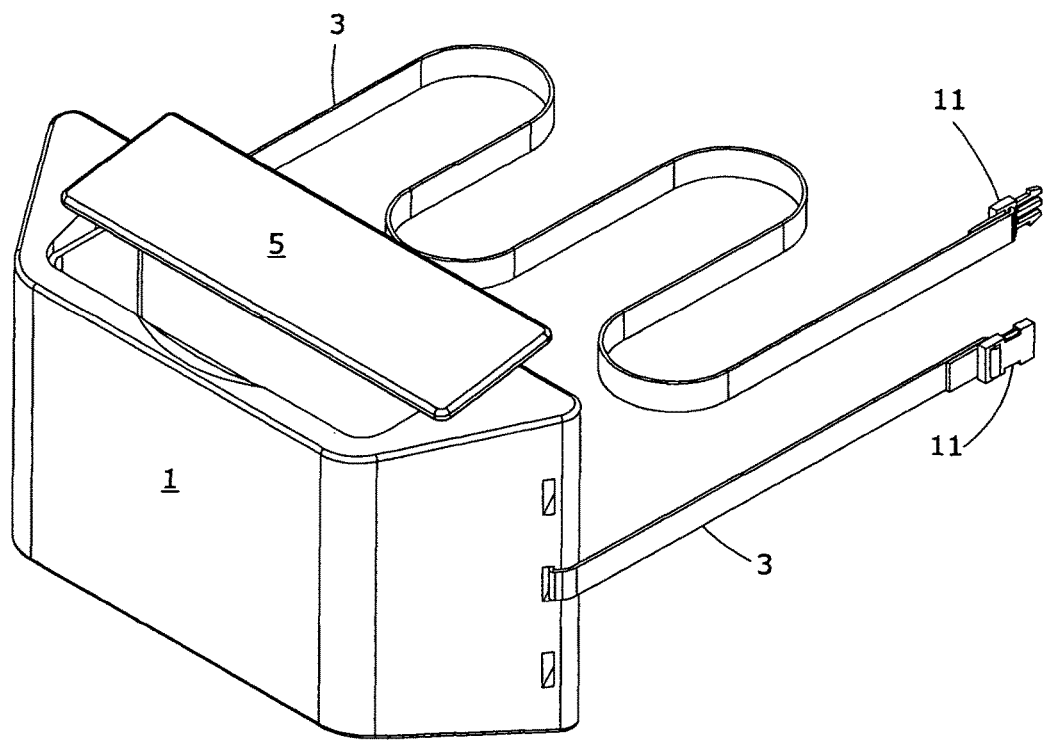
FIG. 12 shows an embodiment of the invention with the lid (5) on top of the top of the outer container (1).

FIG. 12 shows an embodiment of the invention with the lid (5) on top of the outer container (1). In this particular embodiment, a user can open the embodiment by moving the lid with his or her finger, and the lid will slide over the top of the outer container (1). This makes room for a larger lining (2). The lid is half-open here so that the viewer can see that the retractable lid is above the top of the outer container (1) and does not form a continuous gradient with it.

Figure 13:
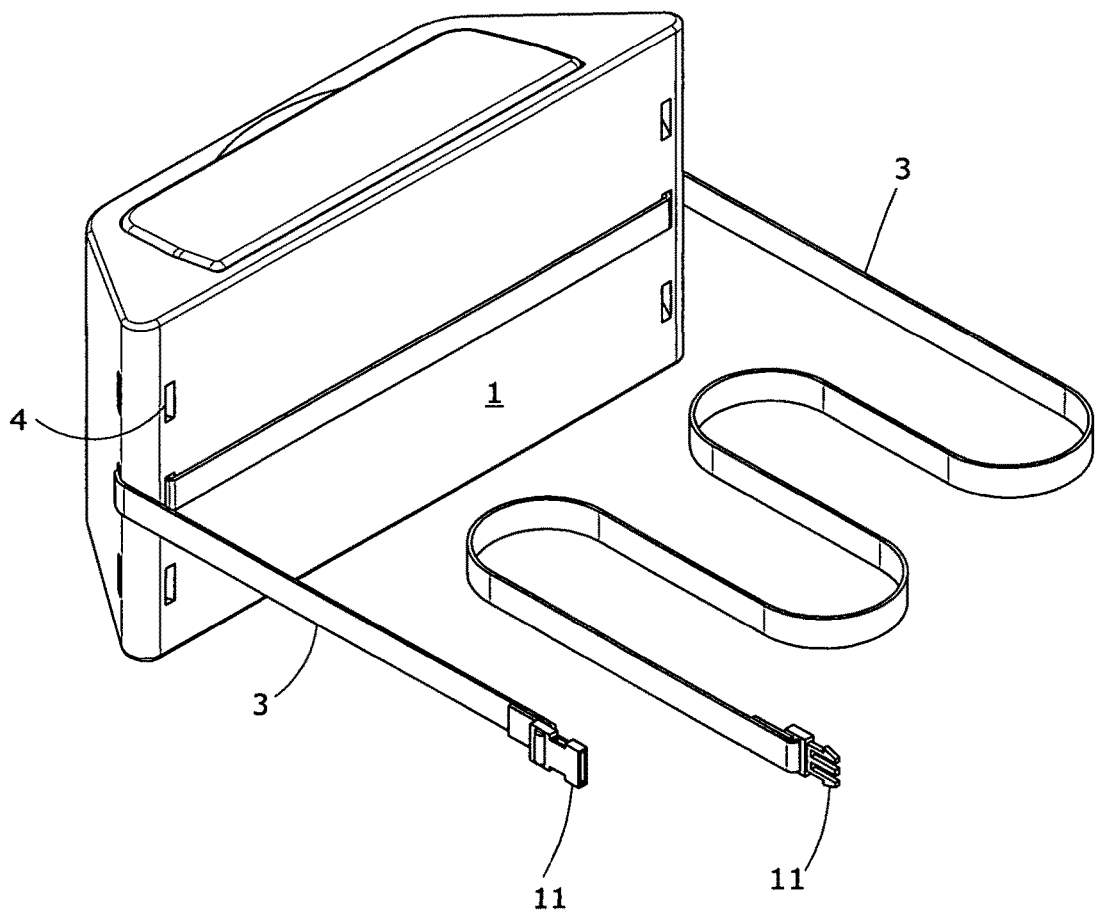
FIG. 13 shows the preferred embodiment of the invention from the back.

FIG. 13 shows the preferred embodiment of the invention from the back. Here, the slots (4) on both sides of the back of the embodiment can be seen. The strap (3) can also be seen.

Figure 14:
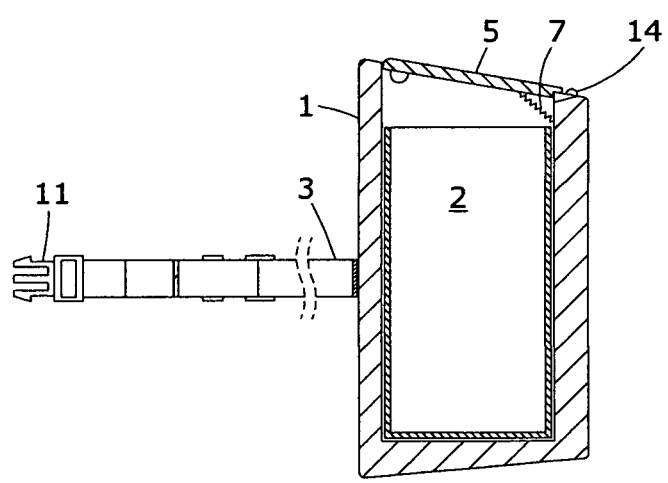
FIG. 14 shows a cross-section of an embodiment of the invention, with a spring (7) which pushes the lid (5) closed after the user stops pressing on the lid. This embodiment also contains a light (14) on the top of the outer container (1).

FIG. 14 shows a cross-section of an embodiment of the invention containing a light (14) on top of the outer container (1) and also a spring (7) which causes the lid (5) to swing closed after the user has opened the lid and taken his or her fingers off the lid. The liner (2) is visible inside the outer container (1). The user can use the light (14) to see and use the embodiment. The light can be powered by a battery or another method, and such lights are known in the prior art.

The invention claimed is:

1. An apparatus for receiving and storing trash, for occupants of vehicles, comprising an outer container (1), a liner (2), a means of attachment of the outer container (1) to the below-seat components of a vehicle, and a lid (5);

said outer container being hollow, oblong in shape, and having a front, a back, a top, a bottom, a left side, and a right side, said lid (5) being attached to said outer container and capable of opening or closing an aperture in said outer container; and said lid either partially or completely blocking said aperture when closed, said liner (2) being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, walls on said liner's sides, and said liner having a bottom wall, said liner also being comprised of a dishwasher-safe material;

and said liner having grooves on its walls to allow a user to grip said liner by said grooves to more easily lift the liner out of said outer container; said apparatus further comprising that said means of attachment of the outer container (1) to the below-seat components of a vehicle is a back panel (6);

where said back panel further comprises flexible rubber, said flexible rubber being sufficiently flexible that when the back panel (6) is pushed against said below-seat components, said back panel will be shaped against said below-seat components, and said flexible rubber also being sufficiently strong that when said back panel (6) is not being pushed said back panel (6) does not change shape, so that a user can push the outer container (1) onto said below-seat components, and said flexible rubber will shape itself against said below-seat components so that said outer container fits compactly against said below-seat components.

2. The apparatus of claim 1, further comprising that the top of said outer container follows a gradual 35-40 degree gradient downward, from the back of said outer container to the front of said outer container, and the bottom of said outer container follows a gradual 10 to 25 degree gradient upward from the back of said outer container to the front of said outer container.

3. The apparatus of claim 2, further comprising that said lid (5) sits on top of the top of said outer container (1), while the aperture in the top of said outer container (1) remains, thus allowing more room inside said outer container for said liner (2) so that said liner (2) can be larger.

4. The apparatus of claim 2, further comprising that part of said top of said outer container next to said lid (5) is either raised and rounded, or lowered and rounded, so that users can more easily open said lid (5) by reaching their fingers into the rounded area and catching said lid (5).

5. An apparatus for receiving and storing trash, for occupants of vehicles, comprising an outer container (1), a liner (2), a means of attachment of the outer container (1) to the below-seat components of a vehicle, and a lid (5);

said outer container being hollow, oblong in shape, and having a front, a back, a top, a bottom, a left side, and a right side, said lid (5) being attached to said outer container and capable of opening or closing an aperture in said outer container; and said lid either partially or completely blocking said aperture when closed, said liner (2) being shaped in a manner that said liner can fit inside said outer container, below the top of said outer container and below said aperture, so that items which are dropped into said aperture will fall into said liner; said liner also being capable of being removed from said outer container when desired by the user; said liner having an opening on said liner's top, having walls on said liner's sides, and said liner having a bottom wall, said apparatus further comprising that the top of said outer container follows a gradual 35-40 degree gradient downward, from the back of said outer container to the front of said outer container; and the bottom of said outer container follows a gradual 10 to 25 degree gradient upward from the back of said outer container to the front of said outer container;

said apparatus further comprising that part of said top of said outer container next to said lid (5) is either raised and rounded, or lowered and rounded, so that users can more easily open said lid (5) by reaching their fingers into the rounded area and catching said lid (5);

said apparatus further comprising that said outer container has a vertical row of at least two slots on said outer container's left side, close to the corner between the left side and the back of said outer container, a vertical row of at least two slots on said outer container's right side, close to the corner between the right side and the back of said outer container, a vertical row of at least two slots on the back of said outer container, close to the corner between the right side of said outer container and the back of said outer container, and a vertical row of at least two slots on the back of said outer container, close to the corner between the left side of said outer container and the back of said outer container;

said apparatus further comprising that the means of attachment of the outer container to the below-seat components of the vehicle is a strap (3) with a buckle (11);

where said strap can be threaded through said slots (4) to attach said strap to said outer container (1), and where said strap can then be used to attach said outer container (1) to said below-seat components by said strap making loops around said below-seat components, while said strap is threaded through said slots and where said buckle (11) can be manipulated to vary the size of said loops.

6. The apparatus of claim 5, further comprising feet on the bottom of said outer container; said feet helping said outer container to stay upright.

7. The apparatus of claim 5, further comprising that said outer container (7) is made of a flexible canvas.

8. The apparatus of claim 5, further comprising that said liner (2) is made of a flexible material.

9. The apparatus of claim 5, further comprising that said liner (2) is made of a flexible material and is disposable.

10. The apparatus of claim 5, further comprising an inner inlay that fits inside said liner, which can be removed from said liner if desired by the user.

11. The apparatus of claim 5, further comprising an inner inlay that fits inside said liner, which can be removed from said liner if desired by the user, and which is disposable.

12. The apparatus of claim 5, further comprising that said liner has one or more indents, or raised points, near the top of said liner, to help users to grip the liner.

13. The apparatus of claim 5, further comprising that the outer container (1), liner (2), and lid (5) are made out of plastic.

14. The apparatus of claim 5, further comprising that the number of slots in each vertical row of slots on the outer container (1) is three.

15. A process of reducing the amount of litter in a vehicle with a large number of occupants, said vehicle belonging to the group comprising buses, airplanes, and boats, by equipping some or all of the seats in said vehicle with the apparatus of claim 5.

16. The apparatus of claim 5, further comprising that the top of said outer container follows a gradual 15-25 degree gradient downward, from the back of said outer container to the front of said outer container.

17. The apparatus of claim 5, further comprising a locking mechanism on the lid (5) of said outer container (1), where said locking mechanism can keep said lid (5) locked to said outer container (1), thus keeping said lid (5) from opening.

18. The apparatus of claim 5, further comprising a latching mechanism on the lid (5) of said outer container (1), where said latching mechanism can keep said lid (5) latched to said outer container (1), thus keeping said lid (5) from opening.

\* \* \* \* \*